G. W. McCOOLE.
HOSE NOZZLE.
APPLICATION FILED FEB. 11, 1911.
1,017,638.
Patented Feb. 13, 1912.
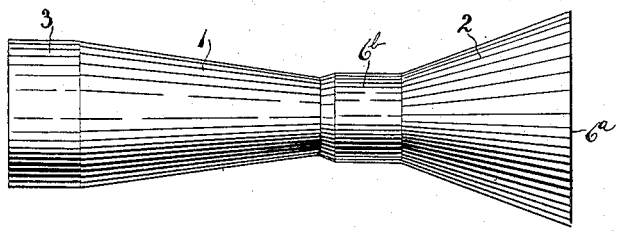
Fig. 1
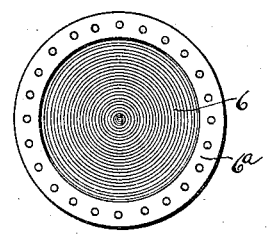
Fig. 2
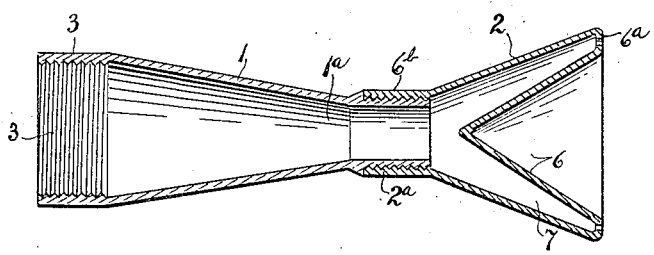
Fig. 3
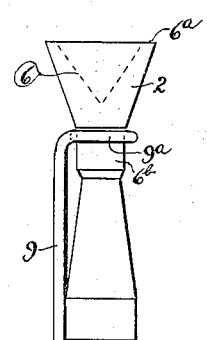
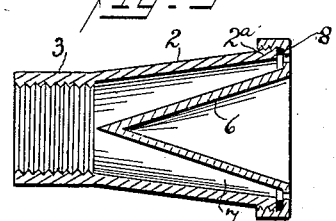
Fig. 5
Fig. 6
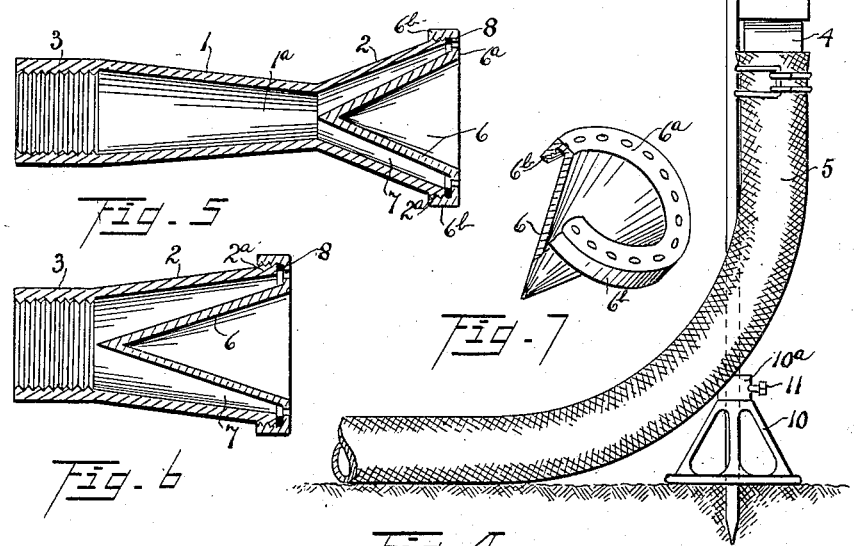
Fig. 7
Fig. 4
Witnesses:
F. Griswold.
E. P. Schlosser
Inventor.
G. W. McCoole
by Obed B. Dillman
Attorney

UNITED STATES PATENT OFFICE.

GABRIEL W. McCOOLE, OF HOT SPRINGS, ARKANSAS.

HOSE-NOZZLE.

1,017,638.  Specification of Letters Patent.  Patented Feb. 13, 1912.

Application filed February 11, 1911. Serial No. 608,033.

*To all whom it may concern:*

Be it known that I, GABRIEL W. McCOOLE, a citizen of the United States, residing at Hot Springs, in the county of Garland and State of Arkansas, have invented certain new and useful Improvements in Hose-Nozzles, of which the following is a specification.

My invention relates to improvements in hose nozzles, and more particularly to that class or type which are designed to be attached to a garden hose for use in throwing or projecting very fine streams or sprays on lawns and in gardens, green-houses, and the like.

The primary object of the invention is to provide a generally improved hose or spray nozzle of this class, of exceedingly simple, cheap, and efficient construction, better adapted to its intended purposes than any other device of the same class with which I am acquainted.

A further object of the invention is to simplify, arrange, and dispose the various parts whereby to reduce the friction in the passage to a minimum, and project the stream in a more efficient and desired manner.

A still further object is to provide an improved cone-shaped deflector member adapted to coöperate with the tubular body and nozzle head to project an ornamental fountain spray particularly designed for use as an ornament to lawns and the like and provided with an improved supporting base or stand whereby the improved hose nozzle may be supported and maintained in a vertical position for such use.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a view of a form of the improved hose nozzle, particularly designed to be spun from sheet material. Fig. 2, an end view of the same. Fig. 3, a longitudinal sectional view of the same. Fig. 4, a view of the same attached to an ordinary garden hose and supported in the vertical position by means of a supporting staff or stand. Fig. 5, a longitudinal sectional view of a modified form of same particularly designed to be cast from brass or other suitable material. Fig. 6, a sectional view of a still further modified form of same. Fig. 7, a perspective view of the improved cone-shaped deflector member detached.

Similar numerals of reference designate like parts throughout all the figures of the drawings.

The improved hose nozzle comprises a main or tubular body portion 1 terminating at one end in a truncated cone-shaped nozzle head 2, and at the other in an internally threaded base portion 3. The threaded base portion 3 is adapted to be threaded upon a threaded nipple member 4, of a hose 5, or if desired, said threaded base portion may be threaded directly upon the end of a stationary pipe or fitting where convenient or desirable.

The main body portion 1, is provided with a constricted bore or passage $1^a$, formed by the converging walls of said tubular body portion and the nozzle head is provided with a flaring bore or enlarged conical shaped passage extending from the more constricted bore or passage $1^a$, and formed by the flaring or diverging walls of said nozzle head 2. The nozzle head 2, is provided with a threaded portion $2^a$, and a cone-shaped spreader or deflector member 6, extending into said nozzle head and forming conjointly with the walls of the latter a wedge-shaped annular passage 7, said cone-shaped spreader member being provided at its base with a perforated annular portion $6^a$, at the end of said wedge-shaped annular passage, and as a means for removably securing said cone-shaped spreader or deflector member upon the nozzle head 2, said annular portion $6^a$, in the form shown in Figs. 5, 6, and 7, is provided with an internally threaded portion $6^b$, taking over and threaded upon the threaded portion $2^a$, of the nozzle head 2. In the form shown in Figs. 1, 2, and 3 the nozzle head is formed integral with the cone-shaped spreader member 6, and has its threaded portion at the most constricted portion of the bore or passage $1^a$.

As a means for preventing leakage, a washer 8, may be interposed between the edge of the nozzle head 2, and the annular portion $6^a$, as shown in Figs. 5 and 6, and as a means for changing the form and force of the projecting streams or sprays, spreader members having various sized openings or perforations in the annular portions 6ª, and various forms of cones may be substituted to meet the varying demands of actual service.

In the modified form shown in Fig. 6, the main or tubular body portion 1, and constricted bore or passage 1ª, are dispensed with, and an annular wedge-shaped passage 7, of slightly different form is provided.

As a means for mounting and supporting the improved nozzle in a vertical position upon the lawn for projecting an ornamental fountain stream, a staff or rod 9, may be provided as indicated in Fig. 4, said staff or rod being provided at its top with a loop head 9ª, adapted to receive and carry the neck portion of the improved nozzle and supported at its base by means of a spider base 10. The pointed end of the rod or staff 9, may be adjustably supported in the sleeve portion 10ª, of the base 10, by means of an adjusting bolt 11.

From the foregoing description, taken in connection with the accompanying drawings, the operation and advantages of my invention will be readily understood.

Having thus described some of the embodiments of my invention, what I claim and desire to secure by Letters Patent is,—

1. A hose nozzle, comprising a tubular body provided with a constricted portion terminating in a truncated cone-shaped flaring nozzle head, and a hollow conical shaped spreader member forming an annular wedge shaped passage intermediate the walls of said spreader member and nozzle head and provided with a perforated rim portion extending across the terminating portion of said passage, said perforated rim portion being provided with an internally threaded portion threaded upon said flaring nozzle head.

2. A hose nozzle comprising a constricted tubular body terminating in an enlarged truncated cone-shaped nozzle head having an externally threaded base, and a hollow cone-shaped deflector member forming an outwardly flaring wedge-shaped annular passage intermediate the walls of said deflector member and said nozzle head and terminating in a perforated internally threaded rim portion extending across the terminating portion of said annular passage and threaded upon said externally threaded base of said nozzle head.

3. A hose nozzle, comprising a constricted tubular body terminating in a flaring nozzle head, and a conical shaped spreader member extending therein and forming conjointly with said nozzle head an annular wedge-shaped passage terminating in a series of perforations about the more enlarged portion of said nozzle head.

In testimony whereof I have affixed my signature in presence of two witnesses.

GABRIEL W. McCOOLE.

Witnesses:
  A. W. BUMPUS,
  C. T. COTHAM.